United States Patent
Hammons (10) Patent No.: US 6,542,928 B1
(45) Date of Patent: Apr. 1, 2003

(54) AUTOMATIC CONFIGURATION OF TESTERS AND HOSTS ON A COMPUTER NETWORK

(75) Inventor: Kevin Hammons, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/089,058

(22) Filed: Jun. 2, 1998

(51) Int. Cl.[7] ............................................. G06F 15/177
(52) U.S. Cl. ..................................... 709/221; 713/100
(58) Field of Search ................................. 709/221, 202, 709/222, 223, 224, 225, 228, 229, 282; 712/15; 713/100, 1; 714/1, 2, 3, 25, 4, 10, 13

(56) References Cited

U.S. PATENT DOCUMENTS

| | | | | |
|---|---|---|---|---|
| 4,847,830 A | * | 7/1989 | Momirov | 370/94 |
| 5,050,071 A | * | 9/1991 | Harris et al. | 707/1 |
| 5,161,102 A | * | 11/1992 | Griffin et al. | 710/104 |
| 5,327,560 A | * | 7/1994 | Hirata et al. | 709/221 |
| 5,557,559 A | * | 9/1996 | Rhodes | 702/118 |
| 5,659,547 A | * | 8/1997 | Scarr et al. | 714/4 |
| 5,664,195 A | * | 9/1997 | Chatterji | 395/712 |
| 5,684,952 A | * | 11/1997 | Stein | 395/200.1 |
| 5,724,510 A | * | 3/1998 | Arndt et al. | 709/220 |
| 5,784,555 A | * | 7/1998 | Stone | 709/220 |
| 5,787,246 A | * | 7/1998 | Lichtman et al. | 709/220 |
| 5,812,857 A | * | 9/1998 | Nelson et al. | 717/173 |
| 5,822,531 A | * | 10/1998 | Gorczyca et al. | 709/221 |
| 5,835,907 A | * | 11/1998 | Hansen | 709/220 |
| 5,841,764 A | * | 11/1998 | Roderique et al. | 370/310 |
| 5,848,244 A | * | 12/1998 | Wilson | 709/221 |
| 5,852,722 A | * | 12/1998 | Hamilton | 709/221 |
| 5,872,928 A | * | 2/1999 | Lewis et al. | 709/222 |
| 5,878,257 A | * | 3/1999 | Nookala et al. | 395/652 |
| 5,892,928 A | * | 4/1999 | Wallach et al. | 710/302 |

(List continued on next page.)

FOREIGN PATENT DOCUMENTS

| | | | | |
|---|---|---|---|---|
| EP | 0 817060 A2 | * | 1/1998 | G06F/12/06 |
| EP | 0817060 A2 | * | 7/1998 | G06F/12/06 |
| JP | 10187638 | * | 7/1998 | G06F/15/16 |

OTHER PUBLICATIONS

IBM, "Task Management of Multiple Digital Signal Processor", Dec. 1991, IBM TDB, v.34, No. 7B, pp. 237–239.*
Varvarigou et al., "Reliable Distributioed System", 1994, Proceedings., 12 Symposium, pp. 212–221.*
Shultz, "comp.bugs.2bsd", Dec. 1995, Newsgroup, http://groups.google com, 63 pages.*
Varvarigou et al., "Distributed Reconfiguration of Multiprocessor systems", 1994, IEEE, pp. 212–221.s.*
Shub, "Exploing Operating system internals with work stations", 1987, ACM, 269–272.*
Schrimpf, "Migration of Processes, Files and Virtual Devices in the MDX Operating System", ACM, pp. 70–81.*
Trueman, "Standby redundancy", 1986, Butterworth & Co. pp. 374–378.*

*Primary Examiner*—Bunjob Jaroenchonwanit
(74) *Attorney, Agent, or Firm*—Perkins Coie LLP (57) ABSTRACT

Automated reconfiguration of computer workstations as tester workstations and host workstations by querying the user for the network address of the tester to be swapped out and copying, creating and reconfiguring the configuration files for the network on the system to be swapped in. This invention allows an engineering department to use a workstation for off-line development and eliminates the need to provide a spare tester workstation to replace a failed tester workstation. Additionally, one embodiment of the invention provides automated reconfiguration of a tester workstation as a host workstation.

5 Claims, 7 Drawing Sheets

U.S. PATENT DOCUMENTS

| | | | |
|---|---|---|---|
| 5,918,016 A | * 6/1999 | Brewer et al. | 709/220 |
| 5,922,050 A | * 7/1999 | Madany | 709/222 |
| 5,937,197 A | * 8/1999 | Jury | 395/712 |
| 5,956,489 A | * 9/1999 | San Andres et al. | 709/221 |
| 5,961,642 A | * 10/1999 | Lewis | 713/1 |
| 5,968,116 A | * 10/1999 | Day et al. | 709/202 |
| 5,980,078 A | * 11/1999 | Krivoshein et al. | 364/131 |
| 6,003,075 A | * 12/1999 | Adrendt et al. | 345/349 |
| 6,003,078 A | * 12/1999 | Kodimer et al. | 709/224 |
| 6,044,408 A | * 3/2000 | Engstrom et al. | 709/302 |
| 6,092,123 A | * 7/2000 | Steffan et al. | 710/8 |
| 6,134,616 A | * 10/2000 | Beatty | 710/104 |
| 6,170,055 B1 | * 1/2001 | Meyer et al. | 713/2 |
| 6,195,694 B1 | * 2/2001 | Chen et al. | 709/220 |
| 6,263,387 B1 | * 7/2001 | Chrabaszcz | 710/103 |
| 6,434,611 B1 | * 8/2002 | Wilson et al. | 709/221 |

* cited by examiner

Fig. 1

```
1    #!/usr/local/bin/ksh
2
3    #
4    # Get the system name you want to set this system up as.
5    # Get the IP information of this system.  Then check and make sure
6    # we have the correct one.  If the IP information is correct make the
7    # changes to the host file.
8    #
9    make_host()
10   {
11
12       print "What system would you like to replace."
13       read temp1
14
15       sys=`ypcat hosts |awk '$2 ~/' $temp1 '/ {print $1,$2,"
16   log hosts" }`
17
18       print "$sys"
19       print "Please enter y if the above information is correct"
20       read ans
21
22       if [ ${ans:-y} = y ] || [ ${ans:-y} = Y ]
23       then
24              grep -v `hostname` /etc/hosts > /tmp/hosts
25              print "$sys" >> /tmp/hosts
26       else
27              print "aborting the operation due to hostfile is
28       incorrect\n"
```

Fig. 2a

| | |
|---|---|
| 29 | exit |
| 30 | fi |
| 31 | mv /etc/hosts /etc/hosts_old |
| 32 | mv /tmp/hosts /etc/hosts |
| 33 | } |
| 34 | |
| 35 | # |
| 36 | # Host_setup check to see if parmgh3 is on line if so copies a new |
| 37 | kernal. |
| 38 | # If parmgh3 is not up checks parmgh1 if this system is online copies |
| 39 | the files. |
| 40 | # Then remove the device file. |
| 41 | # |
| 42 | host_setup() |
| 43 | { |
| 44 | ping parmgh3 1 > /dev/null |
| 45 | if [ $# = 0 ] |
| 46 | then |
| 47 | print "copy from parmgh3" |
| 48 | rcp parmgh3:/vmunix /vmunix_new |
| 49 | mv /vmunix /vmunix_offline |
| 50 | mv /vmunix_new /vmunix |
| 51 | else |
| 52 | ping parmgh1 1 >/dev/null |
| 53 | if [ $# = 0 ] |
| 54 | then |
| 55 | print "copy from parmgh1" |

Fig. 2b

```
56              rcp parmgh1:/vmunix /vmunix_new
57              mv /vmunix /vmunix_offline
58              mv /vmunix_new /vmunix
59         fi
60      fi
61
62      rm -f /dev/j994tst0
63
64 }
65
66 #
67 # Tester_setup check to see if parmg1 is on line if so copies a new
68 kernal.
69 # If parmg1 is not up checks parmg2 if this system is online copies the
70 files.
71 # Then copies the device file.
72 #
73 tester_setup()
74 {
75      ping parmg1 1 >/dev/null
76      if [ $# = 0 ]
77      then
78              rcp parmg1:/vmunix /vmunix_new
79              mv /vmunix /vmunix_online
80              mv /vmunix_new /vmunix
81      else
82              ping parmg2 1 >/dev/null
```

Fig. 2c

```
83              if [ $# = 0 ]
84              then
85                      rcp parmg2:/vmunix /vmunix_new
86                      mv /vmunix /vmunix_online
87                      mv /vmunix_new /vmunix
88              fi
89      fi
90
91      cp /dev/j994tst0_online /dev/j994tst0
92  }
93
94  #
95  # Check_system check to see if this system is a host or a tester.
96  #
97  check_system()
98  {
99          if [ -c /dev/j994tst0 ]
100         then
101                 host_setup
102                 make_host
103         else
104                 tester_setup
105                 make_host
106         fi
107 }
```

Fig. 2d

108     #### Main program

109     ####This is a function call to check_system

110     check_system

AUTOMATIC CONFIGURATION OF TESTERS AND HOSTS ON A COMPUTER NETWORK

BACKGROUND

1. Technical Field

This invention relates generally to the reconfiguration of computers on a computer network. More particularly, this invention relates to a method and system for automatic reconfiguration of tester systems and host a systems in an electronic testing and manufacturing environment.

2. Background of the Invention

Large scale electronics manufacturing requires complex testing systems for both electronic components and electronic assemblies. One of the larger manufacturers of test equipment for this application is Teradyne, Inc. in Boston, Mass.

A typical tester, such as a Teradyne J994, has a UNIX workstation attached which runs all of the testing software and controls the tester itself. The tester workstation has a specially configured kernel as well as one or more specific devices files which allow it to interact with and control the tester. Several tester workstations may be networked together to allow monitoring of the tester workstations as well as communications between tester workstations and other networked devices. Unfortunately, when one of the tester workstations experiences either software or hardware difficulties, it is necessary to replace the tester workstation with either a spare tester workstation or another UNIX workstation and reconfigure the new UNIX workstation as a tester.

Because of the cost associated with having a spare UNIX workstation configured as a spare tester workstation, a stand alone host system is typically substituted for the failed tester workstation and the host system is reconfigured to match the replaced tester workstation. This process can take hours and results in significant down time for the tester. Stand alone host systems may or may not also be part of the computer network and are usually configured for other tasks such as development of testing software to the dedicated tester workstations.

Accordingly, it would be desirable to provide a convenient, fast and therefore economical way to swap a host system in for a tester workstation.

SUMMARY OF THE INVENTION

One embodiment of the invention provides a shell script which verifies the current configuration of the replacement workstation, copies a new kernel onto the workstation to be converted into a tester workstation, creates the necessary device files, and configures the workstation to look and act like a tester workstation as opposed to a host system. This embodiment of the invention accomplishes this by querying the user for the network address of the tester workstation to be swapped out and copying, creating and reconfiguring the configuration files for the network on the system to be swapped in. This invention allows an engineering department to use a workstation for off-line development and eliminates the need to provide a spare tester workstation which is not available for off-line development.

Another embodiment of the invention allows reconfiguration of a tester workstation as a host workstation which is suitable for stand alone use as a development system.

Other advantages will become apparent to those skilled in the art from the following detailed description read in conjunction with the appended claims.

It should be understood that the referenced drawings are intended as representations. The drawings are not necessarily intended to depict the functional and structural details of the invention, which can be determined by one of skill in the art by examination of the descriptions and claims provided herein.

DETAILED DESCRIPTION OF THE INVENTION

Figure 1:
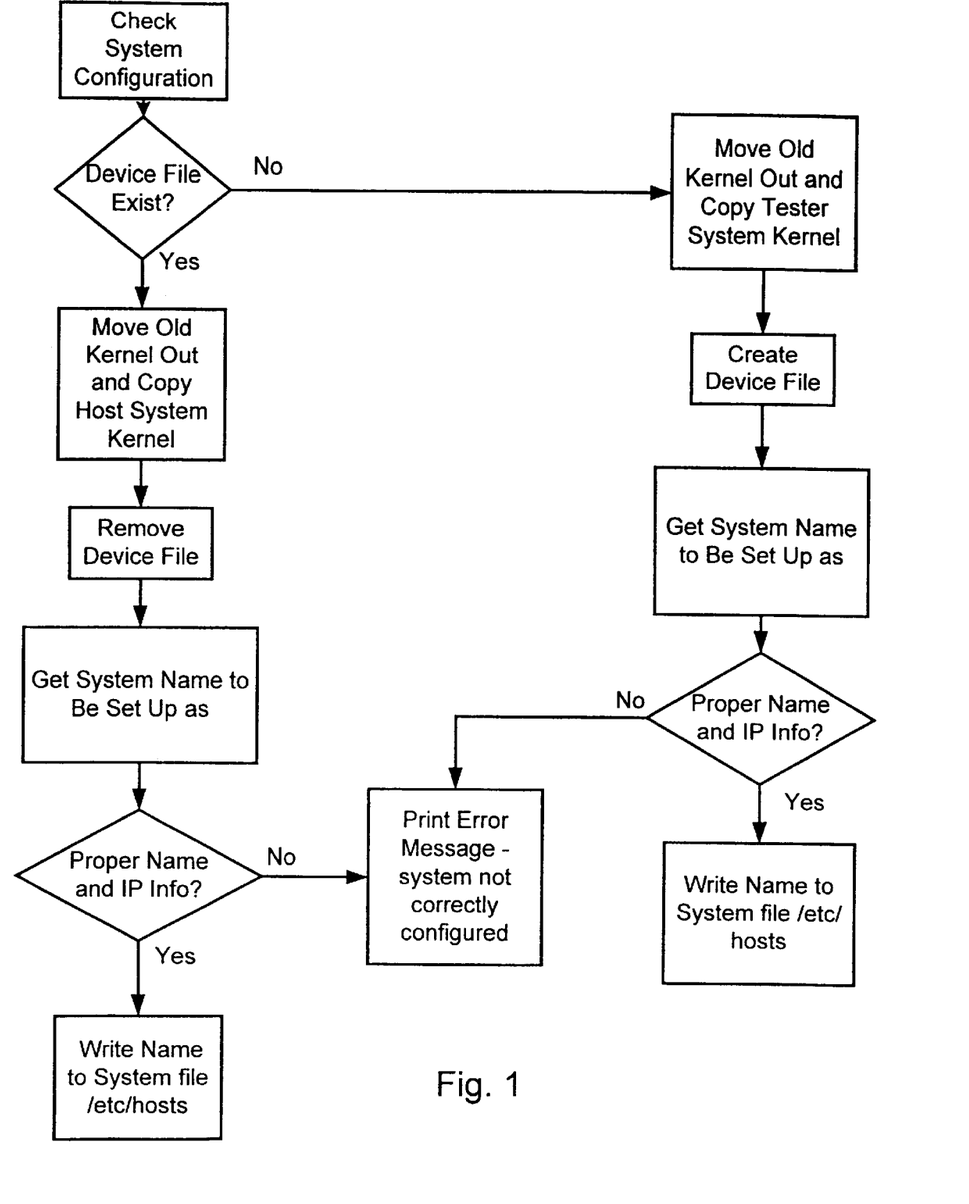
FIG. 1 is a flow diagram of one embodiment of the invention.
Figure 2A:
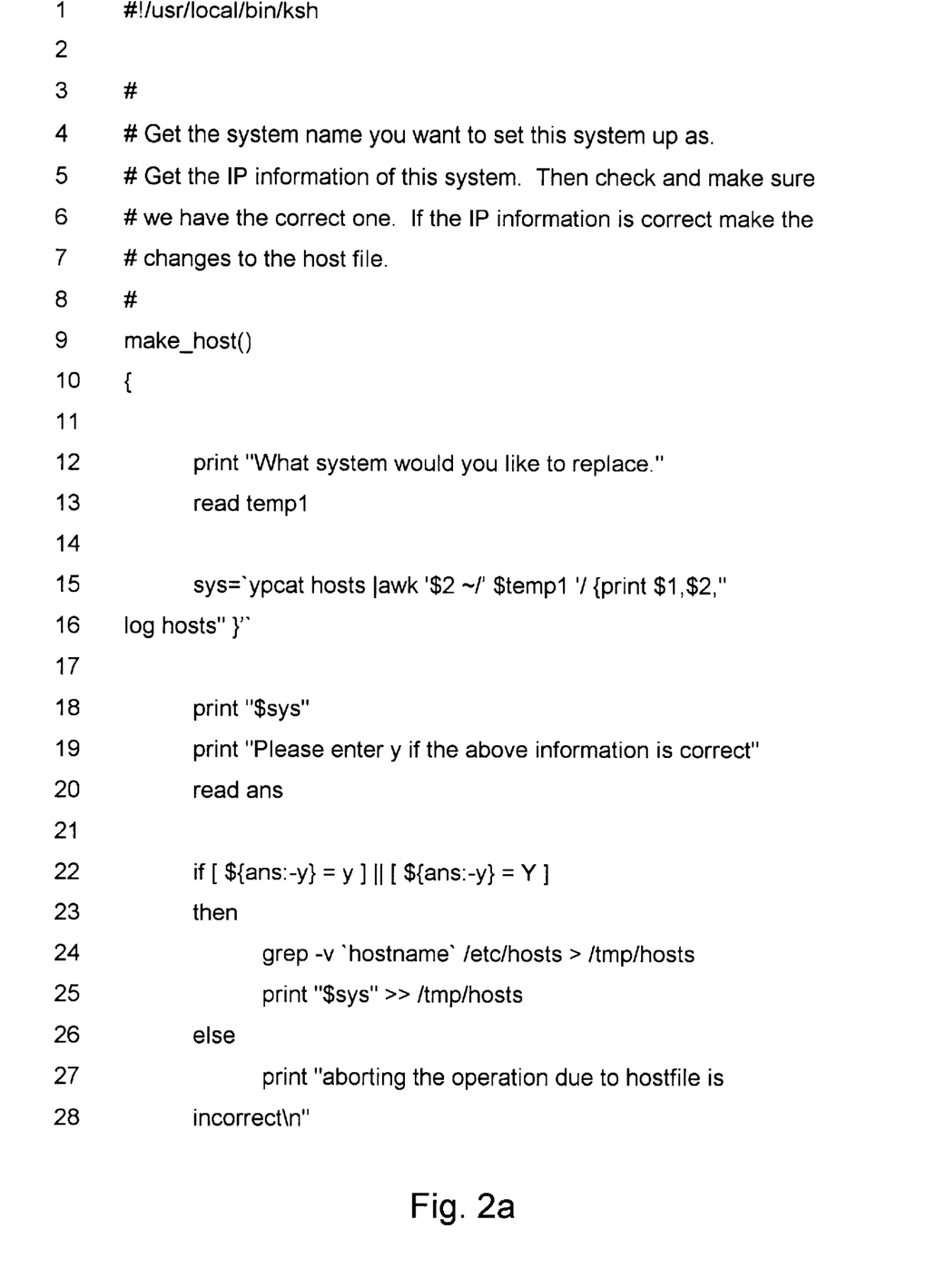
FIGS. 2a through 2e are a shell script code listing for one embodiment of the invention in the UNIX operating environment.
Figure 2B:
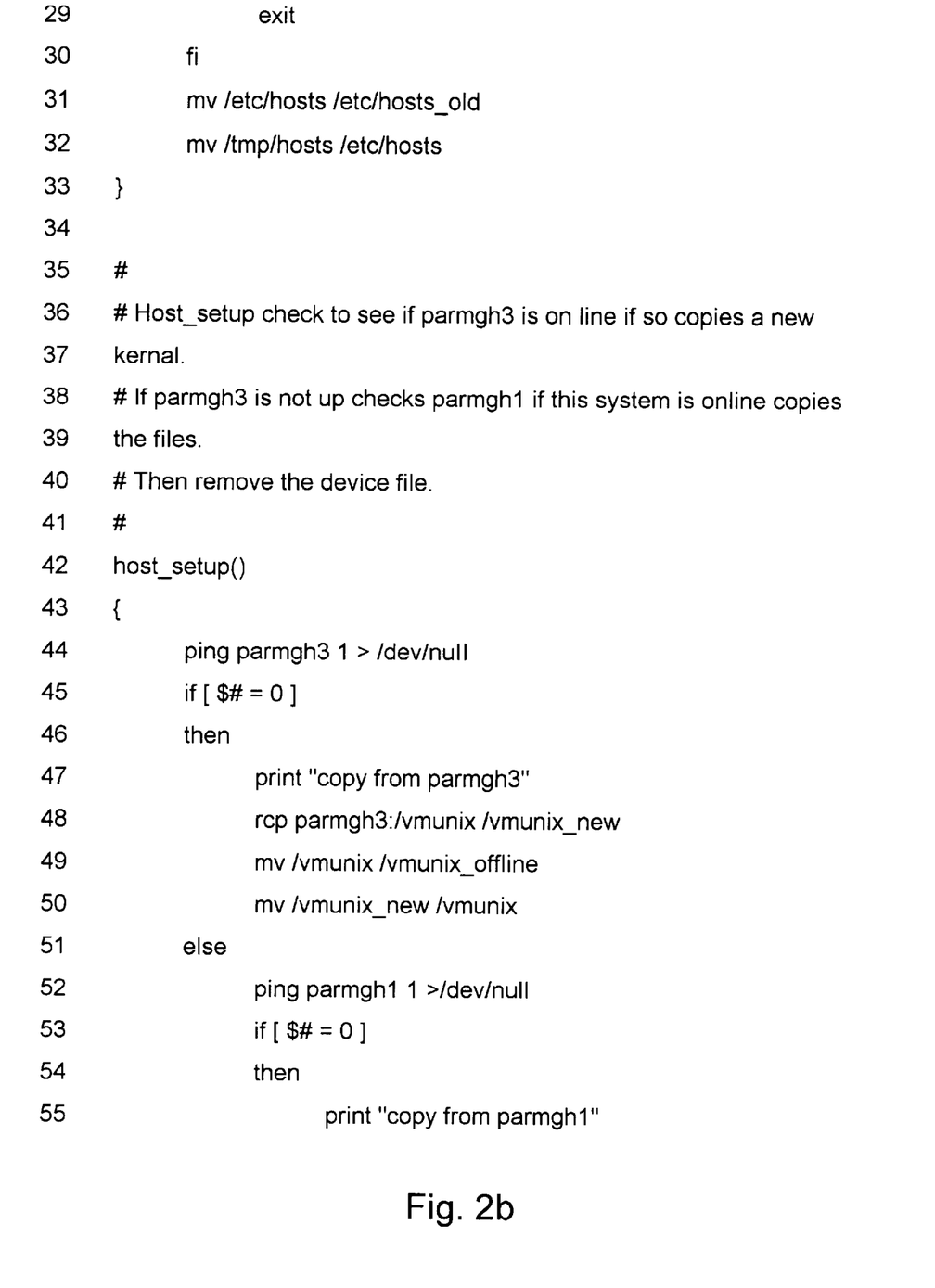
Figure 2C:
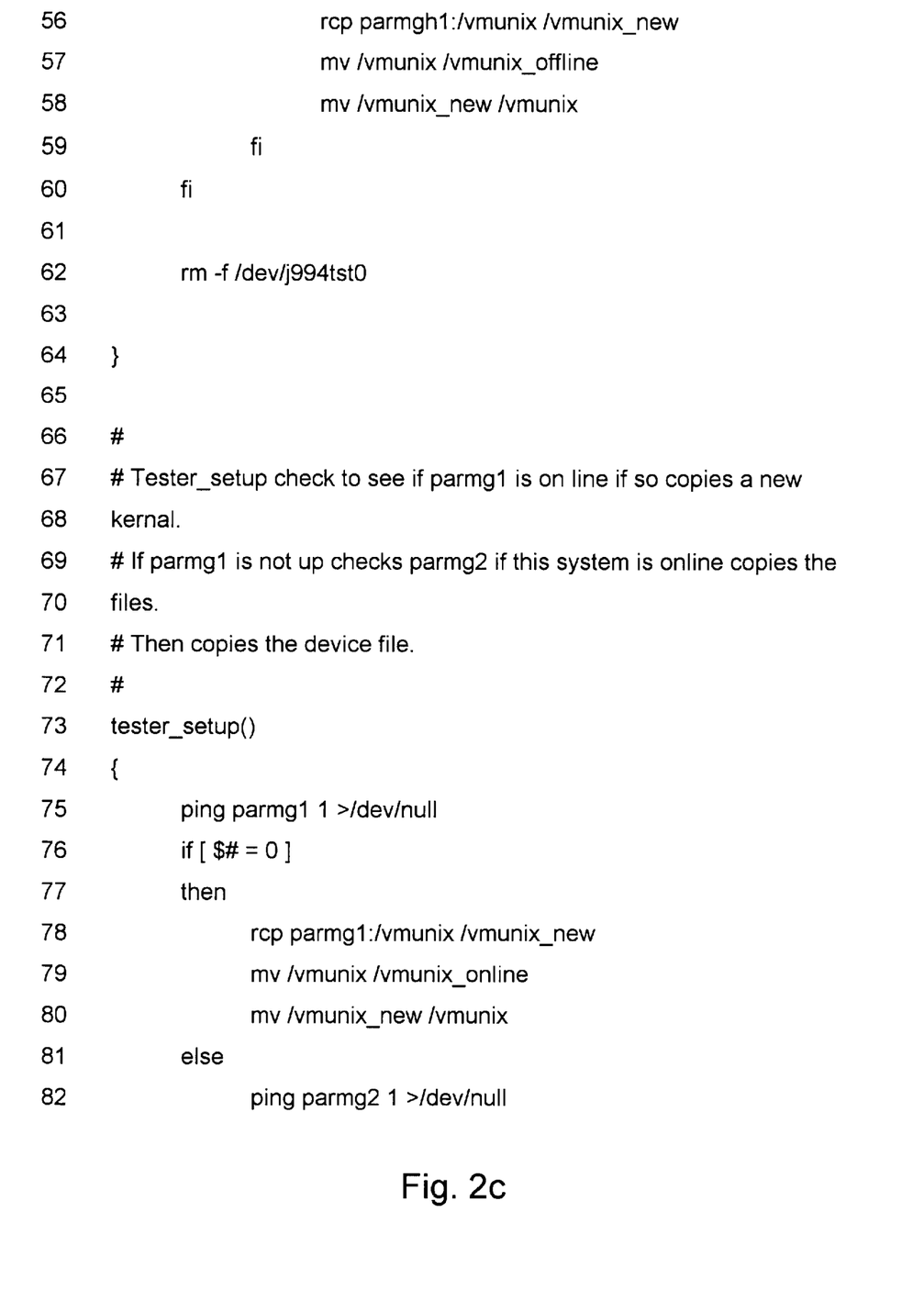
Figure 2D:
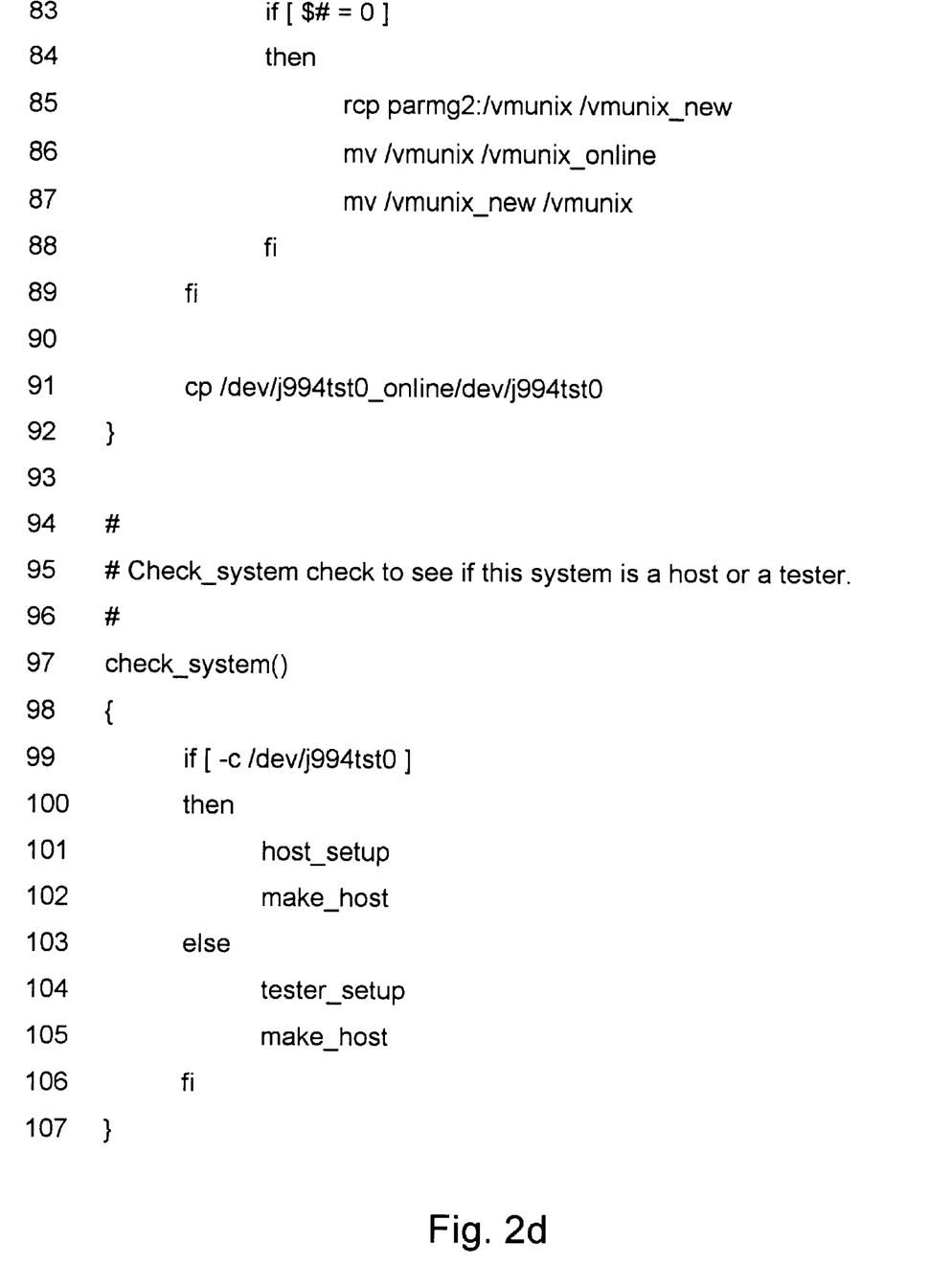
Figure 2E:
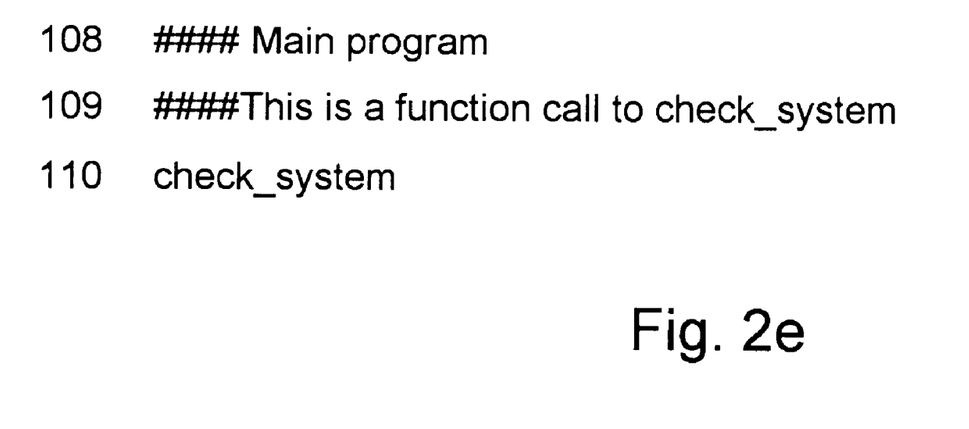
Figure 3:
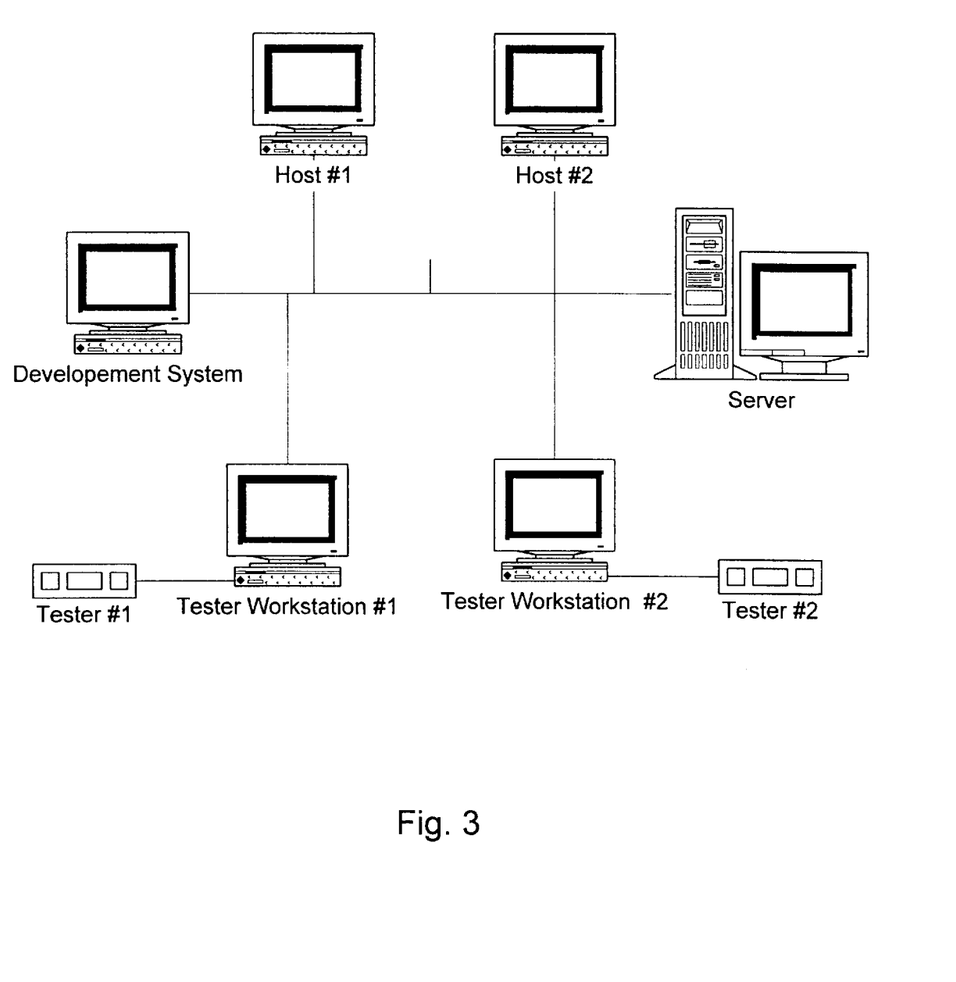
FIG. 3 is a representative schematic diagram of a computer network in which the invention may be implemented.

Referring now to FIGS. 1–3, the invention will be described in detail. FIG. 3 shows a typical environment in which the invention may be practiced which includes networked host and tester workstations. The tester workstations are here each attached to a tester and being configured as tester workstations are here referred to as on-line. The networked host workstations are referred to as off-line, even though the off-line workstations may or may not be part of the network. The terms on-line and off-line are here meant to be specific to the subsystem of testers and tester workstations, with tester workstations being on-line and host workstations being off-line. The network of FIG. 3 also includes a development system and a server.

FIG. 1 graphically depicts the general methodology used to implement a particular embodiment of the invention. This particular embodiment of the invention provides for both reconfiguration of a tester workstation into a host workstation and reconfiguration of a host workstation into a tester workstation. It should be noted that both of these reconfiguration processes can be implemented independently and that, while the specific embodiment set forth in FIGS. 2a through 2e is implemented in a UNIX environment, the general methodology is applicable to other operating environments.

In implementing the methodology of FIG. 1, the first act which is undertaken is to check the existing system configuration for the workstation to be modified. In this particular embodiment, the existence of a device file is used to determine whether the workstation is configured as a tester workstation or as a host workstation. In this particular embodiment, the presence of the device file indicates that the system is presently configured as a tester workstation.

If the device file is not present, the next act to be undertaken is that the old kernel is renamed and a new tester kernel is copied from a tester workstation as the new kernel for the new tester system. Next, the necessary device file is created. The next act undertaken is to query the user for the system name which this system will be set up as. This name is then checked against the existing system name database and the IP address information is obtained for the system name. This information is then displayed for the user to verify. If the IP information does not exist or, the user does not verify the information, an error message is printed informing the user that the system is not correctly configured and therefore cannot be reconfigured. If the IP information is found and the user verifies both the system name and the IP information, the name and IP information are written to the new system's configuration file.

If, on the other hand, in the first act the device file was found, the invention assumes that the system is a tester system and that the user wishes to reconfigure this tester system as a host system. Analogous acts are then undertaken to reconfigure the tester system as a host system, except the device file is removed instead of created.

Referring now particularly to FIG. 3, one embodiment of the invention has program instructions stored with program storage devices such as hard drives or other memory devices resident within the host and tester workstations. In FIGS. 2a through 2e, one embodiment of the invention uses stored programming instructions implemented in a KORN shell script. The line numbers in the figures are for explanation purposes only and do not form part of the actual shell script. This particular shell script has five subroutines, functions and a main program. The main program appears on lines 108 through 110. The five subroutines or functions are: Make_host( ); host_setup( ); tester_setup( ); and check_system( ). The main program is simply a one line instruction which is a function call to check_system( ).

The check_system function appears on lines 94 through 107. Check_system first tests for the presence of device file j994tst0. If this device file is present, check_system will call function host_setup and function make_host. If the device file is not present, check_system will call the function tester_setup and the function make_host.

If the device file is present, the invention assumes that the system is currently set up as a tester and that the user wishes to reconfigure the tester workstation as a host workstation. Consequently, check_system calls host_setup.

Host_setup appears on lines 35 through 62. Host_setup assumes that at least one of two specific host computers are present on the network. Here the computers are named parmgh3 and parmgh1. Host_setup first pings parmgh3. If parmgh3 answers, host_setup will copy its kernel to a new file on the reconfigured workstation called vmunix_new. Host_setup then renames the UNIX kernel to vmunix_offline and renames vmunix_new to vmunix. If parmgh3 does not answer as a result of the ping, host_setup will ping a second host machine, in this case parmgh1, and undertake a similar copy and renaming procedure. Finally, host_setup removes the device file j994tst0.

Next, check_system calls the function make_host( ). Make_host( ) appears on lines 3 through 33. First, make_host( ) queries the user for the name of the system they would like to replace. This name is stored in a temporary variable. Make_host( ) then queries the system host file for the IP information corresponding to the name input by the user and concatenates the IP information and system name into a string which is stored in the variable sys. Contents of the variable sys are then printed and the user is queried to verify that the printed information is correct. If the information is correct, make_host stores the contents of the existing host file into a temporary host file and adds the contents of the variable sys to the end of the temporary host file. If the information is incorrect, an error message is printed indicating to the user that the operation is aborted due to the host file being incorrect. The existing host file is then renamed as host_old and the temporary host file is renamed as the existing host file.

If check_setup does not find the device, it assumes that the system is currently set up as a host workstation and that the user wishes to reconfigure the host workstation as a tester workstation. Consequently, check_system calls tester_setup.

Tester_setup appears on lines 67 through 92. Tester_setup assumes that at least one of two specific tester computers are present on the network. Here the computers are named parmg1 and parmg2. Tester_setup first pings parmg1. If parmg1 answers, tester_setup will copy its kernel to a new file on the reconfigured workstation called vmunix_new. Tester_setup then renames the UNIX kernel to vmunix_online and renames vmunix_new to vmunix. If parmg1 does not answer as a result of the ping, tester_setup will ping a second host machine, in the case parmg2, and undertake a similar copy and renaming procedure. Finally, tester_setup creates the device file j992tst0 by copying it the contents of the file j994tst0 online.

Next, check_system calls the function make_host( ), the results of which were explained earlier.

While this invention has been described with reference to the described embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

I claim:

1. A method for automatically reconfiguring a network computer to function as a tester computer in a manufacturing environment, the method comprising:

determining a configuration of the computer, including determining whether a device file is stored on the computer, wherein the device file on the computer indicates the computer is currently configured as a test computer;

when the device file is not stored on the computer,
    copying a tester kernel from another network computer to the computer; and
    creating a device file for the computer;

receiving an assignment of a system name for the computer from a user;

determining an Internet protocol (IP) address for the system name by searching an existing system name database;

if the IP address is found, displaying the IP address and the system name to the user for verification;

if the IP address is not found, or if the user does not verify the system name and IP address and, generating an error message indicating the system is not configured correctly; and if the user verifies the system name and IP address , writing the system name and the IP address to a configuration file for the computer.

2. A method for automatically reconfiguring a tester computer to function as a host computer in a manufacturing environment, the method comprising:

determining a configuration of a computer, including determining whether a device file is stored on the computer, wherein the device file on the computer indicates the computer is currently configured as a test computer;

when the device file is determined to be stored on the computer,
    copying a host kernel from another host computer to the computer via a network; and
    removing the device file from the computer;
    receiving an assignment of a system name for the computer;

determining an Internet protocol (IP) address for the system name;

generating an error message when the IP address for the system name cannot be determined; and writing the system name and the IP address to a configuration file for the computer.

3. A system for testing electronic components during a manufacturing process, the system comprising:
- at least on stand-alone computer configured for software development;
- at least one tester computer coupled to a network for communicating with at least one tester during the manufacturing process;
- at least one server coupled to the network;
- at least one memory device coupled to the network and storing instructions that, when executed, automatically reconfigure the at least one stand-alone computer to function as the at least one tester computer when the at least one stand-alone computer is physically substituted for one of the at least one tester computers, including, determining whether the at least one stand-alone computer includes a device file;
- when the at least one stand-alone computer does not include a device file, copying a kernel from the at least one tester computer to the at least one stand-alone computer;
- creating a device file for the at least one stand-alone computer;
- receiving a system name for the at least one stand-alone computer;
- verifying the system name; and
- writing the system name and an associated Internet protocol (IP) address to a configuration file for the at least one stand-alone computer, such that the network views the at least one stand-alone computer as a tester computer coupled to a tester device.

4. The system of claim 3, wherein verifying the system name includes;
- determining whether the system name is associated with an IP address;
- prompting a user to verify the system name and IP address; and
- generating an error message when verification fails.

5. The system of claim 3, wherein the instructions include a script in a scripting language.

* * * * *